(12) United States Patent
Dorsey

(10) Patent No.: US 11,507,507 B2
(45) Date of Patent: Nov. 22, 2022

(54) SYSTEM AND METHOD OF BACKING UP DATA FROM A VOLATILE MEMORY MEDIUM TO A NON-VOLATILE MEMORY MEDIUM

(71) Applicant: Dell Products L.P., Round Rock, TX (US)

(72) Inventor: Kurtis Wayne Dorsey, Leander, TX (US)

(73) Assignee: Dell Products L.P., Round Rock, TX (US)

( * ) Notice: Subject to any disclaimer, the term of this patent is extended or adjusted under 35 U.S.C. 154(b) by 57 days.

(21) Appl. No.: 16/938,225

(22) Filed: Jul. 24, 2020

(65) Prior Publication Data
US 2022/0027268 A1  Jan. 27, 2022

(51) Int. Cl.
*G06F 12/0804* (2016.01)
*G06F 3/06* (2006.01)
*G06F 1/30* (2006.01)

(52) U.S. Cl.
CPC ............ *G06F 12/0804* (2013.01); *G06F 1/30* (2013.01); *G06F 3/0619* (2013.01); *G06F 3/0634* (2013.01); *G06F 3/0655* (2013.01); *G06F 3/0685* (2013.01); *G06F 2212/1024* (2013.01); *G06F 2212/1032* (2013.01)

(58) Field of Classification Search
CPC ...... G06F 12/0804; G06F 1/30; G06F 3/0619; G06F 3/0634; G06F 3/0655; G06F 3/0685; G06F 2212/1024; G06F 2212/1032
See application file for complete search history.

(56) References Cited

U.S. PATENT DOCUMENTS

| | | | | |
|---|---|---|---|---|
| 2005/0283648 | A1* | 12/2005 | Ashmore | G06F 1/3268 |
| | | | | 714/5.11 |
| 2009/0006888 | A1* | 1/2009 | Bernhard | G06F 11/08 |
| | | | | 714/6.12 |

(Continued)

OTHER PUBLICATIONS

"EMC Unity: High Availability a Detailed Review", Dell EMC, Jan. 2017 (Year: 2017).*

(Continued)

*Primary Examiner* — Michael Krofcheck
(74) *Attorney, Agent, or Firm* — McDermott Will & Emery LLP

(57) ABSTRACT

In one or more embodiments, one or more systems, one or more methods, and/or one or more processes may: determine that a power loss to an information handling system (IHS) has occurred; utilize one or more batteries to power the IHS; enable a predicable latency mode of a non-volatile memory medium of the IHS to enter a deterministic window; transfer data from a volatile memory medium of the IHS to a data repository of a namespace of the non-volatile memory medium; determine that power is provided to the IHS; in response to determining that power is provided to the IHS, transfer the data from the data repository to the volatile memory medium; and after transferring the data from the data repository to the volatile memory medium, disable the predicable latency mode of the non-volatile memory medium to exit the deterministic window of the non-volatile memory medium.

19 Claims, 10 Drawing Sheets

(56) References Cited

U.S. PATENT DOCUMENTS

| | | | |
|---|---|---|---|
| 2014/0281131 A1* | 9/2014 | Joshi | G06F 12/0804 |
| | | | 711/133 |
| 2014/0330787 A1* | 11/2014 | Modukuri | G06F 11/2056 |
| | | | 707/659 |
| 2017/0293428 A1* | 10/2017 | Radovanovic | G01M 13/00 |

OTHER PUBLICATIONS

Tallis, Billy, "NVMe 1.4 Specification Published: Further Optimizing Performance and Reliability," AnandTech, Jun. 14, 2019, https://www.anandtech.com/show/14543/nvme-14-specification-published (Year: 2019).*

Suhler, Paul et al., "Managing Capacity in NVM Express SSDs." SDC 19, Sep. 23, 2019.

NVM Express, Revision 1.4, Jun. 10, 2019.

* cited by examiner

SYSTEM AND METHOD OF BACKING UP DATA FROM A VOLATILE MEMORY MEDIUM TO A NON-VOLATILE MEMORY MEDIUM

BACKGROUND

Field of the Disclosure

This disclosure relates generally to information handling systems and more particularly to backing up data from a volatile memory medium to a volatile memory medium.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

SUMMARY

In one or more embodiments, one or more systems, one or more methods, and/or one or more processes may determine that a power loss to the information handling system has occurred; may utilize one or more batteries to power the information handling system; may enable a predicable latency mode of a non-volatile memory medium of the information handling system to enter a deterministic window of the non-volatile memory medium; may transfer data from a volatile memory medium of the information handling system to a data repository of a first namespace of the non-volatile memory medium; may determine that power is provided to the information handling system; in response to determining that power is provided to the information handling system, may transfer the data from the data repository of the first namespace of the non-volatile memory medium to the volatile memory medium; and after transferring the data from the data repository of the first namespace of the non-volatile memory medium to the volatile memory medium, may disable the predicable latency mode of the non-volatile memory medium to exit the deterministic window of the non-volatile memory medium. In one or more embodiments, the non-volatile memory medium may include a solid state drive. In one or more embodiments, the non-volatile memory medium may include a non-volatile memory that complies with at least a portion of a non-volatile memory express specification.

In one or more embodiments, the deterministic window may prevent at least one read operation from colliding with transferring the data from the volatile memory medium to the data repository of the first namespace. In one or more embodiments, the one or more systems, the one or more methods, and/or the one or more processes may further configure the first namespace of the non-volatile memory medium. In one or more embodiments, the one or more systems, the one or more methods, and/or the one or more processes may further configure a second namespace of the non-volatile memory medium, different from the first namespace of the non-volatile memory medium. For example, the one or more systems, the one or more methods, and/or the one or more processes may further install an operating system on the second namespace of the non-volatile memory medium.

In one or more embodiments, the one or more systems, the one or more methods, and/or the one or more processes may further configure a first endurance group of the non-volatile memory medium and may further configure a second endurance group of the non-volatile memory medium. In one example, configuring the first namespace of the non-volatile memory medium may include configuring the first namespace on the first endurance group. In another example, configuring the second namespace of the non-volatile memory medium may include configuring the second namespace on the second endurance group. In one or more embodiments, a first storage area of the non-volatile memory medium may include the first endurance group, and a second storage area of the non-volatile memory medium, different from the first storage area, includes the second endurance group.

BRIEF DESCRIPTION OF THE DRAWINGS

For a more complete understanding of the present disclosure and its features/advantages, reference is now made to the following description, taken in conjunction with the accompanying drawings, which are not drawn to scale, and in which.

DETAILED DESCRIPTION

Figure 1A:
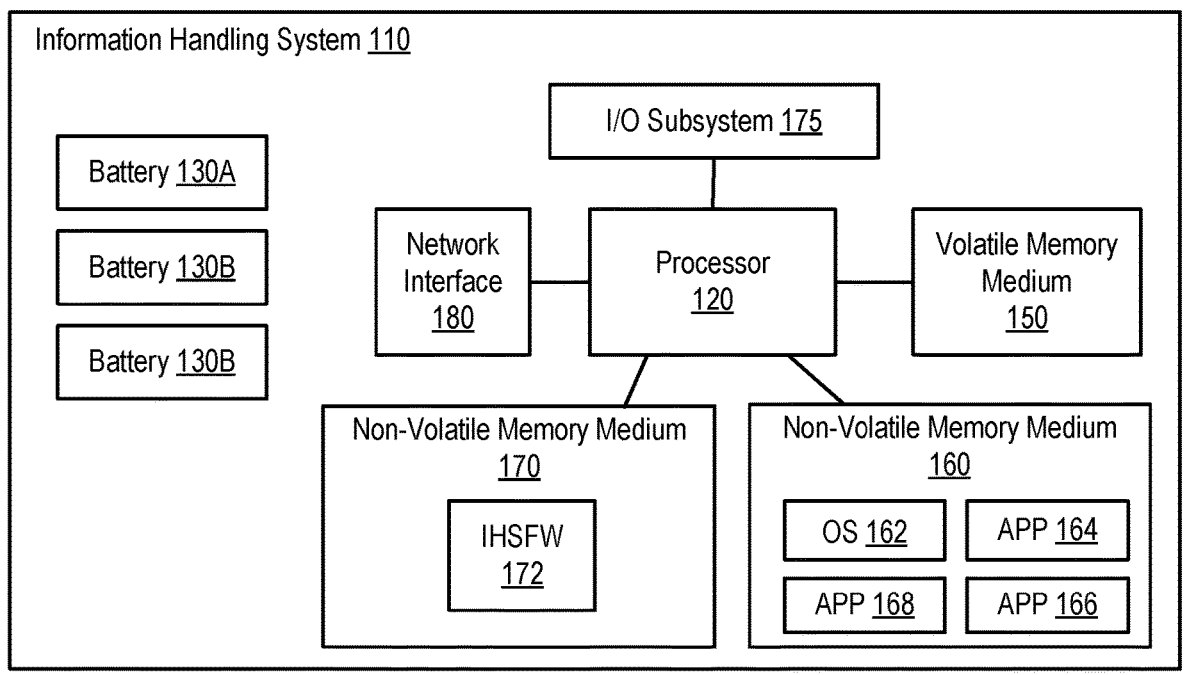
FIG. 1A illustrates an example of an information handling system that includes batteries, according to one or more embodiments.

In the following description, details are set forth by way of example to facilitate discussion of the disclosed subject matter. It should be apparent to a person of ordinary skill in the field, however, that the disclosed embodiments are examples and not exhaustive of all possible embodiments.

As used herein, a reference numeral refers to a class or type of entity, and any letter following such reference numeral refers to a specific instance of a particular entity of that class or type. Thus, for example, a hypothetical entity referenced by '12A' may refer to a particular instance of a particular class/type, and the reference '12' may refer to a collection of instances belonging to that particular class/type or any one instance of that class/type in general.

In one or more embodiments, an information handling system may utilize vaulting. For example, vaulting may include a process of backing up data from a volatile memory medium of the information handling system to a non-volatile memory medium of the information handling system in response to a power loss event. In one or more embodiments, an implementation of a vaulting application that utilizes one or more solid state drives (SSDs) may involve a solid state drive (SSD) to be a stand alone device that is ready to receive a vault (e.g., a data backup from a volatile memory medium) during a power fail event. In one example, a power fail event may include the information handling system losing A/C (alternating current) power. In another example, a power fail event may include a power supply of the information handling system failing to produce enough power or failing to produce any power to properly operate the information handling system. In one or more embodiments, an implementation of a vaulting application that utilizes one or more SSDs may involve a partition, which is separate from an operating system and other information handling system data, that is ready to receive a vault (e.g., the data backup) during a power fail event.

If an implementation of a vaulting application utilizes a standalone device, an additional drive interface may be required, which may be only utilized during power fail events. For example, the implementation of the vaulting application may utilize a size of a volatile memory medium of storage in the standalone device, which may underutilize the standalone device (e.g., a SDD). Further, for instance, an additional M.2 interface, an additional U.2 interface, or an additional mSATA (mini serial AT attachment) interface may be required, which may be only utilized during power fail events. If an implementation of a vaulting application utilizes a partition, separate from operating system and other information handling system data, one or more additional processes may be performed to ensure that a SSD device is ready to accept a vault (e.g., the data backup) and still operate at a peak performance of the SSD.

In one or more embodiments, utilizing endurance group management may enable partitioning a SSD into different namespaces, where each of the different namespaces may be associated with its own endurance characteristics. For example, a first namespace of the SSD may be established for a vault (e.g., a storage area for the data dump), and a second namespace of the SSD may be established for an operating system. For instance, when writes are performed to the second namespace, an OP (over provisioning) for the second namespace may be utilized, keeping the first namespace in a preconditioned state. In one or more embodiments, I/O (input/output) determinism may be utilized for a vaulting process. For example, during normal I/O (e.g., random I/O) with the SSD, the I/O may be in a non-deterministic state, yet when a vaulting process is needed, the SSD may enter a deterministic state and achieve required I/O throughputs such that the SSD may successfully be utilized in the vaulting process.

In one or more embodiments, a vaulting process may include determining that a power loss to an information handling system has occurred. Determining that a power loss to an information handling system has occurred may include determining that A/C power is no longer available to the information handling system. In one example, a power outage may have occurred causing the A/C power to no longer be available to the information handling system. In another example, a power cord may have been unplugged. For instance, the power cord may have been accidentally unplugged. In one or more embodiments, a power supply of the information handling system may have developed an issue. For example, the power supply may no longer be able to properly power the information handling system. For instance, no longer being able to properly power the information handling system may include a power loss to an information handling system.

In one or more embodiments, one or more batteries may be utilized to power the information handling system. The one or more batteries may store a limited amount of energy. For example, the limited amount of energy may power the information handling system for a limited amount of time. In one or more embodiments, a predicable latency mode of a non-volatile memory medium (e.g., a SSD) of the information handling system may be enabled to enter a deterministic window of the non-volatile memory medium. For example, the deterministic window may prevent at least one read operation from colliding with transferring the data from a volatile memory medium, of the information handling system, to the non-volatile memory medium. For instance, the non-volatile memory medium may include a first namespace that includes a data repository to receive data from the volatile memory medium, and the deterministic window may prevent at least one read operation from colliding with transferring the data from the volatile memory medium to the data repository of the first namespace. The deterministic window may enable a backup of data of the volatile memory medium to occur within the limited amount of time imposed by the limited amount of power that the one or more batteries may supply to the information handling system.

In one or more embodiments, data from the volatile memory medium of the information handling system may be transferred to the data repository of the first namespace of the non-volatile memory medium. It may be determined that power is provided to the information handling system. In one example, A/C power may be restored to the information handling system. In another example, the power supply may be repaired or replaced with a functioning power supply.

In one or more embodiments, the data from the data repository of the first namespace of the non-volatile memory medium may be transferred to the volatile memory medium. For example, transferring the data from the data repository of the first namespace of the non-volatile memory medium to the volatile memory medium may be performed in response to determining that power is provided to the information handling system. The predicable latency mode of the non-volatile memory medium may be disabled to exit the deterministic window of the non-volatile memory medium. For example, disabling the predicable latency mode of the non-volatile memory medium to exit the deterministic window of the non-volatile memory medium may be performed after transferring the data from the data repository of the first namespace of the non-volatile memory medium to the volatile memory medium. Exiting the deterministic window of the non-volatile memory medium may permit the non-volatile memory medium to resume background operations, such garbage collection and wear leveling, among others.

Figure 1B:
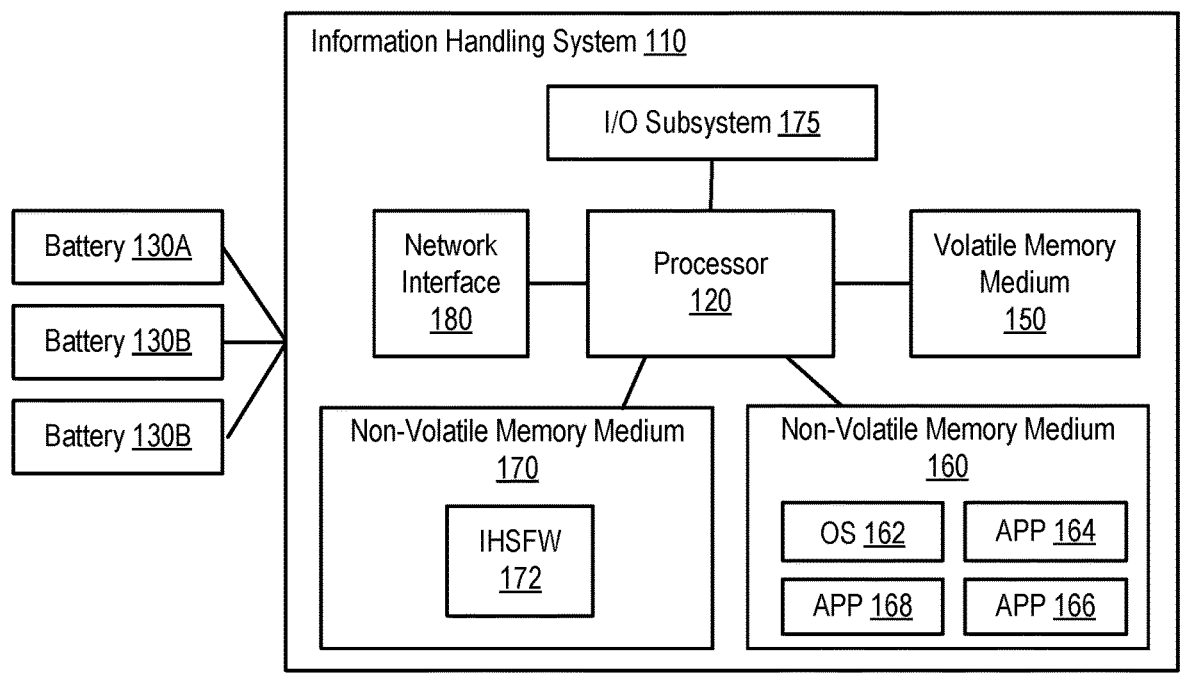
FIG. 1B illustrates an example of an information handling system that is coupled to external batteries, according to one or more embodiments.

Turning now to FIGS. 1A and 1B, examples of an information handling system are illustrated, according to one or more embodiments. An information handling system (IHS) 110 may include a hardware resource or an aggregate of hardware resources operable to compute, classify, process, transmit, receive, retrieve, originate, switch, store, display, manifest, detect, record, reproduce, handle, and/or utilize various forms of information, intelligence, or data for business, scientific, control, entertainment, or other purposes, according to one or more embodiments. For example, IHS 110 may be a personal computer, a desktop computer system, a laptop computer system, a server computer system, a mobile device, a tablet computing device, a personal digital assistant (PDA), a consumer electronic device, an electronic music player, an electronic camera, an electronic video player, a wireless access point, a network storage device, or another suitable device and may vary in size, shape, performance, functionality, and price. In one or more embodiments, a portable IHS 110 may include or have a form factor of that of or similar to one or more of a laptop, a notebook, a telephone, a tablet, and a PDA, among others. For example, a portable IHS 110 may be readily carried and/or transported by a user (e.g., a person). In one or more embodiments, components of IHS 110 may include one or more storage devices, one or more communications ports for communicating with external devices as well as various input and output (I/O) devices, such as a keyboard, a mouse, and a video display, among others. In one or more embodiments, IHS 110 may include one or more buses operable to transmit communication between or among two or more hardware components. In one example, a bus of IHS 110 may include one or more of a memory bus, a peripheral bus, and a local bus, among others. In another example, a bus of IHS 110 may include one or more of a Micro Channel Architecture (MCA) bus, an Industry Standard Architecture (ISA) bus, an Enhanced ISA (EISA) bus, a Peripheral Component Interconnect (PCI) bus, HyperTransport (HT) bus, an inter-integrated circuit (I²C) bus, a serial peripheral interface (SPI) bus, a low pin count (LPC) bus, an enhanced serial peripheral interface (eSPI) bus, a universal serial bus (USB), a system management bus (SMBus), and a Video Electronics Standards Association (VESA) local bus, among others.

In one or more embodiments, IHS 110 may include firmware that controls and/or communicates with one or more hard drives, network circuitry, one or more memory devices, one or more I/O devices, and/or one or more other peripheral devices. For example, firmware may include software embedded in an IHS component utilized to perform tasks. In one or more embodiments, firmware may be stored in non-volatile memory, such as storage that does not lose stored data upon loss of power. In one example, firmware associated with an IHS component may be stored in non-volatile memory that is accessible to one or more IHS components. In another example, firmware associated with an IHS component may be stored in non-volatile memory that may be dedicated to and includes part of that component. For instance, an embedded controller may include firmware that may be stored via non-volatile memory that may be dedicated to and includes part of the embedded controller.

As shown, IHS 110 may include a processor 120, a volatile memory medium 150, non-volatile memory media 160 and 170, an I/O subsystem 175, and a network interface 180. As illustrated, volatile memory medium 150, non-volatile memory media 160 and 170, I/O subsystem 175, and network interface 180 may be communicatively coupled to processor 120.

In one or more embodiments, one or more of volatile memory medium 150, non-volatile memory media 160 and 170, I/O subsystem 175, and network interface 180 may be communicatively coupled to processor 120 via one or more buses, one or more switches, and/or one or more root complexes, among others. In one example, one or more of volatile memory medium 150, non-volatile memory media 160 and 170, I/O subsystem 175, and network interface 180 may be communicatively coupled to processor 120 via one or more PCI-Express (PCIe) root complexes. In another example, one or more of an I/O subsystem 175 and a network interface 180 may be communicatively coupled to processor 120 via one or more PCIe switches.

In one or more embodiments, the term "memory medium" may mean a "storage device", a "memory", a "memory device", a "tangible computer readable storage medium", and/or a "computer-readable medium". For example, computer-readable media may include, without limitation, storage media such as a direct access storage device (e.g., a hard disk drive, a floppy disk, etc.), a sequential access storage device (e.g., a tape disk drive), a compact disk (CD), a CD-ROM, a digital versatile disc (DVD), a random access memory (RAM), a read-only memory (ROM), a one-time programmable (OTP) memory, an electrically erasable programmable read-only memory (EEPROM), and/or a flash memory, a SSD, or any combination of the foregoing, among others.

In one or more embodiments, one or more protocols may be utilized in transferring data to and/or from a memory medium. For example, the one or more protocols may include one or more of small computer system interface (SCSI), Serial Attached SCSI (SAS) or another transport that operates with the SCSI protocol, advanced technology attachment (ATA), serial ATA (SATA), a USB interface, an Institute of Electrical and Electronics Engineers (IEEE) 1394 interface, a Thunderbolt interface, an advanced technology attachment packet interface (ATAPI), serial storage architecture (SSA), integrated drive electronics (IDE), or any combination thereof, among others.

Volatile memory medium 150 may include volatile storage such as, for example, RAM, DRAM (dynamic RAM), EDO RAM (extended data out RAM), SRAM (static RAM), etc. One or more of non-volatile memory media 160 and 170 may include nonvolatile storage such as, for example, a read only memory (ROM), a programmable ROM (PROM), an erasable PROM (EPROM), an electrically erasable PROM, NVRAM (non-volatile RAM), ferroelectric RAM (FRAM), a magnetic medium (e.g., a hard drive, a floppy disk, a magnetic tape, etc.), optical storage (e.g., a CD, a DVD, a BLU-RAY disc, etc.), flash memory, a SSD, etc. In one or more embodiments, a memory medium can include one or more volatile storages and/or one or more nonvolatile storages.

In one or more embodiments, network interface 180 may be utilized in communicating with one or more networks and/or one or more other information handling systems. In one example, network interface 180 may enable IHS 110 to communicate via a network utilizing a suitable transmission protocol and/or standard. In a second example, network interface 180 may be coupled to a wired network. In a third example, network interface 180 may be coupled to an optical network. In another example, network interface 180 may be coupled to a wireless network. In one instance, the wireless network may include a cellular telephone network. In a second instance, the wireless network may include a satellite telephone network. In another instance, the wireless network may include a wireless Ethernet network (e.g., a Wi-Fi network, an IEEE 802.11 network, etc.).

In one or more embodiments, network interface 180 may be communicatively coupled via a network to a network storage resource. For example, the network may be implemented as, or may be a part of, a storage area network (SAN), personal area network (PAN), local area network (LAN), a metropolitan area network (MAN), a wide area network (WAN), a wireless local area network (WLAN), a virtual private network (VPN), an intranet, an Internet or another appropriate architecture or system that facilitates the communication of signals, data and/or messages (generally referred to as data). For instance, the network may transmit data utilizing a desired storage and/or communication protocol, including one or more of Fibre Channel, Frame Relay, Asynchronous Transfer Mode (ATM), Internet protocol (IP), other packet-based protocol, Internet SCSI (iSCSI), or any combination thereof, among others.

In one or more embodiments, processor 120 may execute processor instructions in implementing at least a portion of one or more systems, at least a portion of one or more flowcharts, at least a portion of one or more methods, and/or at least a portion of one or more processes described herein. In one example, processor 120 may execute processor instructions from one or more of memory media 150, 160, and 170 in implementing at least a portion of one or more systems, at least a portion of one or more flowcharts, at least a portion of one or more methods, and/or at least a portion of one or more processes described herein. In another example, processor 120 may execute processor instructions via network interface 180 in implementing at least a portion of one or more systems, at least a portion of one or more flowcharts, at least a portion of one or more methods, and/or at least a portion of one or more processes described herein.

In one or more embodiments, processor 120 may include one or more of a system, a device, and an apparatus operable to interpret and/or execute program instructions and/or process data, among others, and may include one or more of a microprocessor, a microcontroller, a digital signal processor (DSP), an application specific integrated circuit (ASIC), and another digital or analog circuitry configured to interpret and/or execute program instructions and/or process data, among others. In one example, processor 120 may interpret and/or execute program instructions and/or process data stored locally (e.g., via memory media 150, 160, and 170 and/or another component of IHS 110). In another example, processor 120 may interpret and/or execute program instructions and/or process data stored remotely (e.g., via a network storage resource).

In one or more embodiments, I/O subsystem 175 may represent a variety of communication interfaces, graphics interfaces, video interfaces, user input interfaces, and/or peripheral interfaces, among others. For example, I/O subsystem 175 may include one or more of a touch panel and a display adapter, among others. For instance, a touch panel may include circuitry that enables touch functionality in conjunction with a display that is driven by a display adapter.

As shown, non-volatile memory medium 160 may include an operating system (OS) 162, and applications (APPs) 164-168. In one or more embodiments, one or more of OS 162 and APPs 164-168 may include processor instructions executable by processor 120. In one example, processor 120 may execute processor instructions of one or more of OS 162 and APPs 164-168 via non-volatile memory medium 160. In another example, one or more portions of the processor instructions of the one or more of OS 162 and APPs 164-168 may be transferred to volatile memory medium 150, and processor 120 may execute the one or more portions of the processor instructions of the one or more of OS 162 and APPs 164-168 via volatile memory medium 150. Although not specifically illustrated, non-volatile memory medium 160 may include one or more log files and/or one or more user directories, among others, according to one or more embodiments.

As illustrated, non-volatile memory medium 170 may include information handling system firmware (IHSFW) 172. In one or more embodiments, IHSFW 172 may include processor instructions executable by processor 120. For example, IHSFW 172 may include one or more structures and/or one or more functionalities of and/or compliant with one or more of a basic input/output system (BIOS), an Extensible Firmware Interface (EFI), a Unified Extensible Firmware Interface (UEFI), and an Advanced Configuration and Power Interface (ACPI), among others. In one instance, processor 120 may execute processor instructions of IHSFW 172 via non-volatile memory medium 170. In another instance, one or more portions of the processor instructions of IHSFW 172 may be transferred to volatile memory medium 150, and processor 120 may execute the one or more portions of the processor instructions of IHSFW 172 via volatile memory medium 150.

In one or more embodiments, OS 162 may include a management information exchange. In one example, the management information exchange may permit multiple components to exchange management information associated with managed elements and/or may permit control and/or management of the managed elements. In another example, the management information exchange may include a driver and/or a driver model that may provide an OS interface through which managed elements (e.g., elements of IHS 110) may provide information and/or notifications, among others. In one instance, the management information exchange may be or include a Windows Management Interface (WMI) for ACPI (available from Microsoft Corporation). In another instance, the management information exchange may be or include a Common Information Model (CIM) (available via the Distributed Management Task Force). In one or more embodiments, the management information exchange may include a combination of the WMI and the CIM. For example, WMI may be and/or may be utilized as an interface to the CIM. For instance, the WMI may be utilized to provide and/or send CIM object information to OS 162.

In one or more embodiments, processor 120 and one or more components of IHS 110 may be included in a system-on-chip (SoC). For example, the SoC may include processor 120 and a platform controller hub (not specifically illustrated). As illustrated in FIG. 1A, IHS 110 may include batteries 130A-130C. Although FIG. 1A illustrates that IHS 110 may include batteries 130A-130C, IHS 110 may include a single battery 130. As shown in FIG. 1B, IHS 110 may be coupled external batteries 130A-130C. Although FIG. 1B illustrates that IHS 110 may be coupled external batteries 130A-130C, IHS 110 may be coupled to a single external battery 130.

Figure 2A:
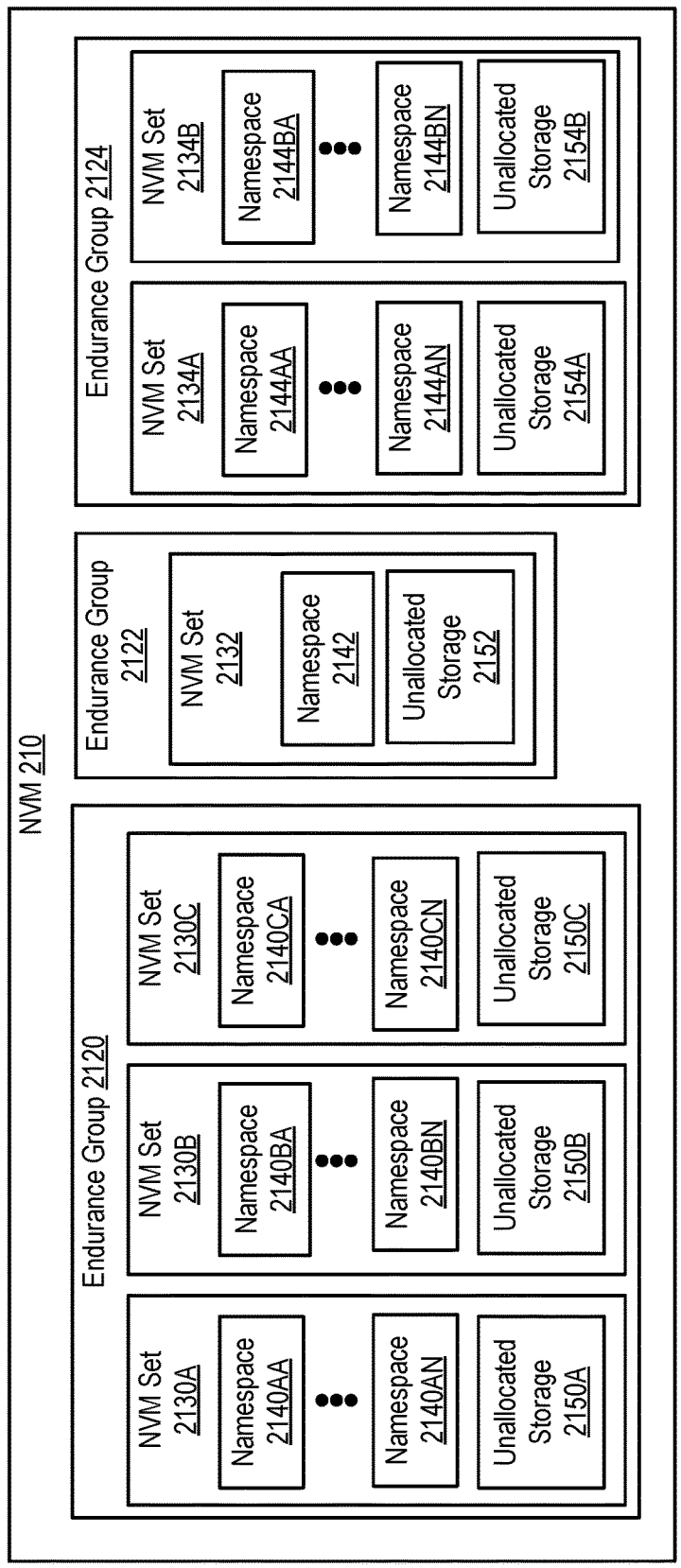
FIG. 2A illustrates an example of a non-volatile memory, according to one or more embodiments.

Turning now to FIG. 2A, an example of a non-volatile memory is illustrated, according to one or more embodiments. As shown, a non-volatile memory (NVM) 210 may include multiple endurance groups 2120, 2122, 2124, 2126, and 2128. In one or more embodiments, NVM 210 may be or may include a non-volatile memory device. For example, NVM 210 may be or may include a SSD. Although five endurance groups are illustrated, NVM 210 may include two or more endurance groups, according to one or more embodiments. In one or more embodiments, NVM 210 may include one or more structures and/or one or more functionalities of and/or may be compliant with at least a portion of a NVM express (NVMe) specification. For example, NVM 210 may include one or more structures and/or one or more functionalities of and/or may be compliant with at least a portion of a NVMe specification version 1.4.

In one or more embodiments, an endurance group may include one or more NVM sets. As illustrated, endurance group 2120 may include NVM sets 2130A-2130C. As shown, endurance group 2122 may include a NVM set 2132. As illustrated, endurance group 2124 may include NVM sets 2134A and 2134B. In one or more embodiments, a NVM set may include one or more namespaces. As illustrated, NVM set 2130A may include namespaces 2140AA-2140AN. As shown, NVM set 2130B may include namespaces 2140BA-2140BN. As illustrated, NVM set 2130C may include namespaces 2140CA-2140CN. As shown, NVM set 2132 may include a namespaces 2142. As illustrated, NVM set 2134A may include namespaces 2144AA-2144AN. As shown, NVM set 2134B may include namespaces 2144BA-2144BN.

In one or more embodiments, a NVM set may include unallocated storage. As illustrated, NVM set 2130A may include unallocated storage 2150A. As shown, NVM set 2130B may include unallocated storage 2150B. As illustrated, NVM set 2130C may include unallocated storage 2150C. As shown, NVM set 2132 may include unallocated storage 2152. As illustrated, NVM set 2134A may include unallocated storage 2154A. As shown, NVM set 2134B may include unallocated storage 2154B. In one or more embodiments, unallocated storage may become part of a namespace as additional data is added to the namespace.

In one or more embodiments, an endurance group may include a separate pool of storage. For example, an endurance group may include a separate pool of storage for wear leveling purposes. For instance, a first endurance group may include a first pool of storage, and a second endurance group may include a second pool of storage, separate from the first pool of storage. As an example, if a NVM include the first endurance group and the second endurance group, the first endurance group may be completely wear out, which may cause the first endurance group to become read-only, while data may still be able to be written to the second endurance group.

In one or more embodiments, NVM 210 may include multiple dies. NVM 210 may include multiple NAND dies. For example, NVM 210 may include NAND flash memory. In one instance, NVM 210 may be configured to map the multiple dies to different NVM sets. In another instance, NVM 210 may be configured to map the multiple dies to different endurance groups. As an example, NVM 210 may be configured to map first multiple dies to a first NVM set and map second multiple dies to a second NVM set. As another example, NVM 210 may be configured to map first multiple dies to a first endurance group and map second multiple dies to a second endurance group. This may provide for separation of wear out. This may also provide for partitioning performance.

In one or more embodiments, NVM 210 may include a predictable latency mode (PLM) (e.g., a deterministic mode). For example, the PLM may permit IHS 110 to temporarily suspend any background processing a NVM controller (e.g., a SSD controller) may perform. For instance, suspending any background processing the NVM controller may ensure that new I/O commands from IHS 110 are processed quickly (e.g., immediately processed) and/or are processed before any background processing. In this fashion, NVM 210 may provide a best-case performance and/or a consistent performance.

In one or more embodiments, NVM 210 may not utilize the PLM indefinitely. For example, background processing may resume after an amount of time transpires. Examples of background processing may garbage collection and wear leveling, among others. For instance, the background processing must resume at some point in time for NVM 210 to function properly. In one or more embodiments, NVM 210 may provide one or more running estimates of how much time NVM 210 may remain in a deterministic window before NVM 210 has to switch back to non-deterministic performance. In one or more embodiments, NVM 210 may provide an estimated amount of data random reads and/or optimal-sized writes NVM 210 can process deterministically. For example, NVM 210 may provide that information to OS 162 and/or IHSFW 172, among others.

In one or more embodiments, the PLM may be utilized in one or more environments where host software may load-balance across multiple non-volatile memories (NVMs) 210. For example, high-priority I/O may be directed to NVMs 210 that are in a deterministic window. In one instance, NVMs 210 that are in a non-deterministic window may not be included in I/O for their background processing to occur. In another instance, NVMs 210 that are in a non-deterministic window may be utilized to handle and/or process low-priority I/O.

Figure 2B:
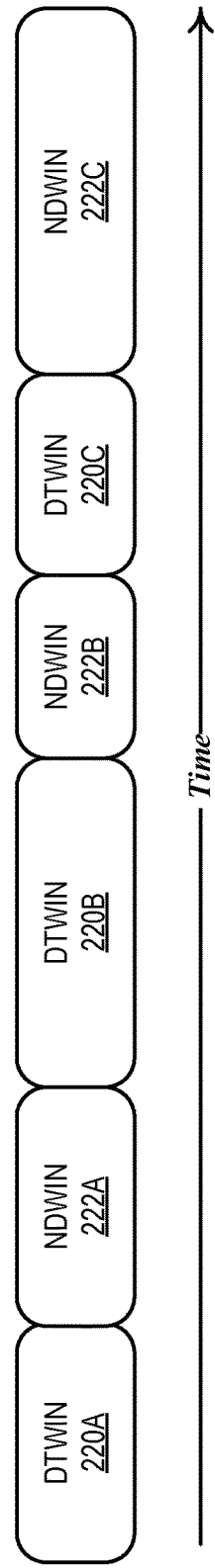
FIG. 2B illustrates an example of switching between a deterministic window and a non-deterministic window over time, according to one or more embodiments.

As illustrated in FIG. 2B, NVM 210 may switch between a deterministic window (DTWIN) 220 and a non-deterministic window (NDWIN) 222 over time. In one example, a DTWIN 220A may occur within a first amount of time. In a second example, a NDWIN 222A may occur within a second amount of time. For instance, the second amount of time may be equal to the first amount of time. In a third example, a DTWIN 220B may occur within a third amount of time. In a fourth example, a NDWIN 222B may occur within a fourth amount of time. For instance, the fourth amount of time may be less than the third amount of time. In a fifth example, a DTWIN 220C may occur within a fifth amount of time. In another example, a NDWIN 222B may occur within a sixth amount of time. For instance, the sixth amount of time may be greater than the fifth amount of time.

In one or more embodiments, NVM 210 may be configured to provide a warning at a customizable threshold before a limit is reached. For example, NVM 210 may provide processor 120 a warning when a threshold is reached or exceeded. For instance, processor 120 may not poll one or more status indicators to determine if NVM 210 is close to leaving its deterministic window. In one or more embodiments, NVM 210 may be configured to utilize multiple command submission and completion queues. For example, each processor core of multiple processor cores of processor 120 may be associated with one or more command submission and completion queues of the multiple command submission and completion queues. In one or more embodiments, a queue may be associated with a NVM set. For example, processor 120 may provide NVM 210 with information that associates a NVM set with a queue. For instance, utilizing this information, a NVM controller may further reduce latency or improve QoS (quality of service) when using the PLM. In one or more embodiments, a write protection may be associated with a namespace. For example, a namespace may be configured to be read only. For instance, namespace may be configured to be read only until a next power cycle, may be configured to be read only until a first power cycle after a write protect feature is disabled, or may be configured to be permanently read only for a lifetime of NVM 210.

Figure 2C:
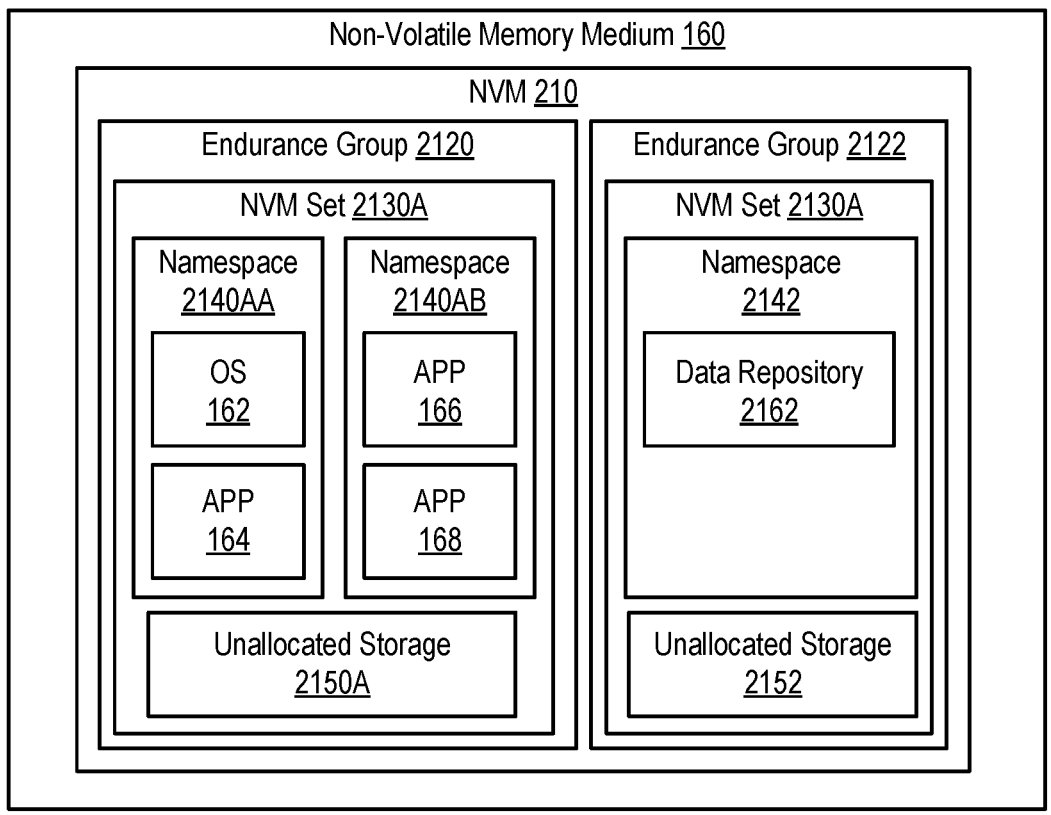
FIG. 2C illustrates an example of a non-volatile memory medium that includes a non-volatile memory which includes multiple namespaces and a data repository.
Figure 2D:
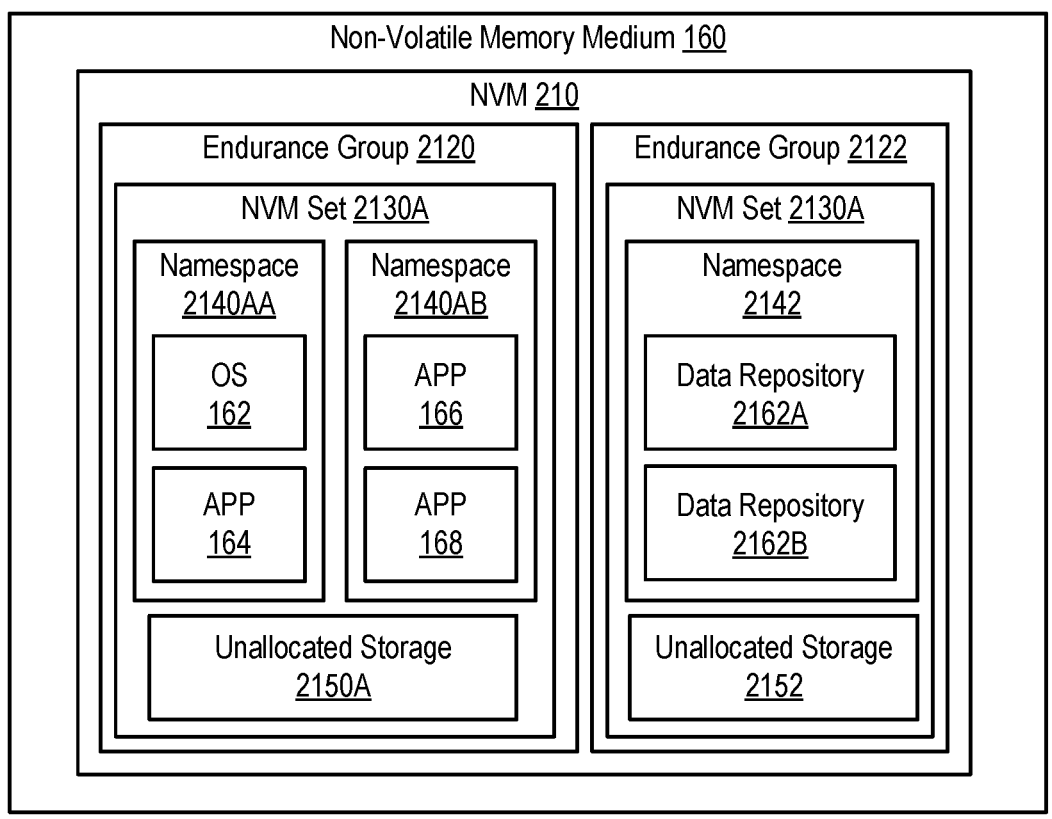
FIG. 2D illustrates an example of a non-volatile memory medium that includes a non-volatile memory which includes multiple namespaces and multiple data repositories.

Turning now to FIGS. 2C and 2D, examples of a non-volatile memory medium that includes a non-volatile memory are illustrated, according to one or more embodiments. As shown, non-volatile memory medium 160 may include NVM 210. As illustrated, namespace 2140AA may store OS 162 and APP 164. As shown, namespace 2140AB may store applications (APPs) 166 and 168. As illustrated in FIG. 2C, namespace 2142 may store a single data repository 2162. In one or more embodiments, data from volatile memory medium 150 may be stored via data repository 2162. As shown in FIG. 2D, namespace 2142 may store multiple data repositories 2162A and 2162B. In one or more embodiments, data from volatile memory medium 150, at a first time, may be stored via data repository 2162A, and data from volatile memory medium 150, at a second time, may be stored via data repository 2162B. For example, data repositories 2162A and 2162B may be utilized to store data from volatile memory medium 150 at different times. For instance, data repositories 2162A and 2162B may be alternated to store data from volatile memory medium 150 at different times. Although not specifically illustrated in FIGS. 2C and 2D, namespace 2140AA and/or 2140AB may not include one or more log files and/or one or more user directories, among others, according to one or more embodiments. For example, namespace 2142 may not include one or more log files and/or one or more user directories, or other related data. For instance, namespace 2142 may only be utilized for data backups of volatile memory medium 150. In one or more embodiments, namespace 2142 may only be utilized for data backups of volatile memory medium 150 to achieve one or more peak performances of backups volatile memory medium 150 to namespace 2142.

Figure 3A:
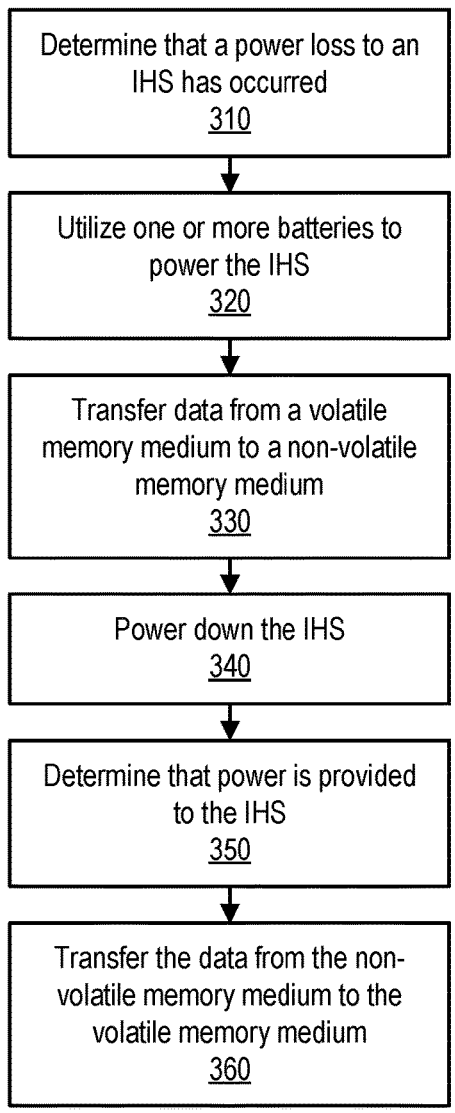
FIG. 3A illustrates an example of a method of operating an information handling system, according to one or more embodiments.

Turning now to FIG. 3A, an example of a method of operating an information handling system is illustrated, according to one or more embodiments. At 310, it may be determined that a power loss to an information handling system has occurred. In one example, OS 162 may determine that a power loss to IHS 110 has occurred. For instance, a driver of OS 162 or a driver loaded into OS 162 may determine that a power loss to IHS 110 has occurred. In another example, IHSFW 172 may determine that a power loss to IHS 110 has occurred.

At 320, one or more batteries may be utilized to power the information handling system. In one example, one or more batteries may be external to IHS 110 and may be utilized to power IHS 110. For instance, IHS 110 may not include the one or more batteries. In another example, one or more batteries may be internal to IHS 110 and may be utilized to power IHS 110. For instance, IHS 110 may include the one or more batteries.

At 330, data from a volatile memory medium may be transferred to a non-volatile memory medium. For example, data from volatile memory medium 150 may be transferred to non-volatile memory medium 160. In one instance, OS 162 may transfer data from volatile memory medium 150 to non-volatile memory medium 160. In another instance, the driver of OS 162 or the driver loaded into OS 162 may transfer data from volatile memory medium 150 to non-volatile memory medium 160. In one or more embodiments, IHSFW 172 may provide, to OS 162, information that indicates that data from volatile memory medium 150 is to be transferred to non-volatile memory medium 160. For example, IHSFW 172 providing, to OS 162, the information that indicates that data from volatile memory medium 150 is to be transferred to non-volatile memory medium 160 may include IHSFW 172 utilizing a management information exchange to provide the information to OS 162. For instance, utilizing the management information exchange to provide the information to OS 162 may include utilizing one or more of CIM and WMI to provide the information to OS 162.

Figure 4A:
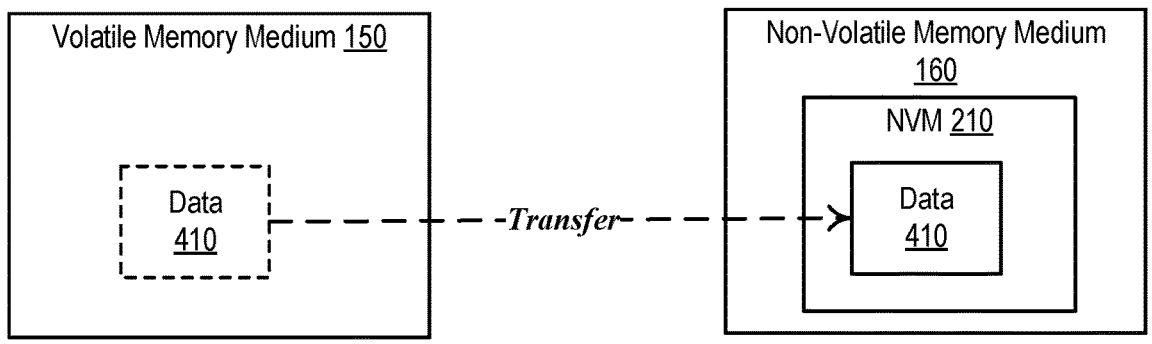
FIG. 4A illustrates an example of data transferred from a volatile memory medium to a non-volatile memory, according to one or more embodiments.

In one or more embodiments, non-volatile memory medium 160 may include NVM 210. For example, transferring the data from volatile memory medium 150 to non-volatile memory medium 160 may include transferring the data from volatile memory medium 150 to NVM 210. For instance, data 410 may be transferred from volatile memory medium 150 to NVM 210, as illustrated in FIG. 4A. In one or more embodiments, data 410 may include all data stored by volatile memory medium 150. In one or more embodiments, data 410 may include a portion of data stored by volatile memory medium 150.

Figure 4B:
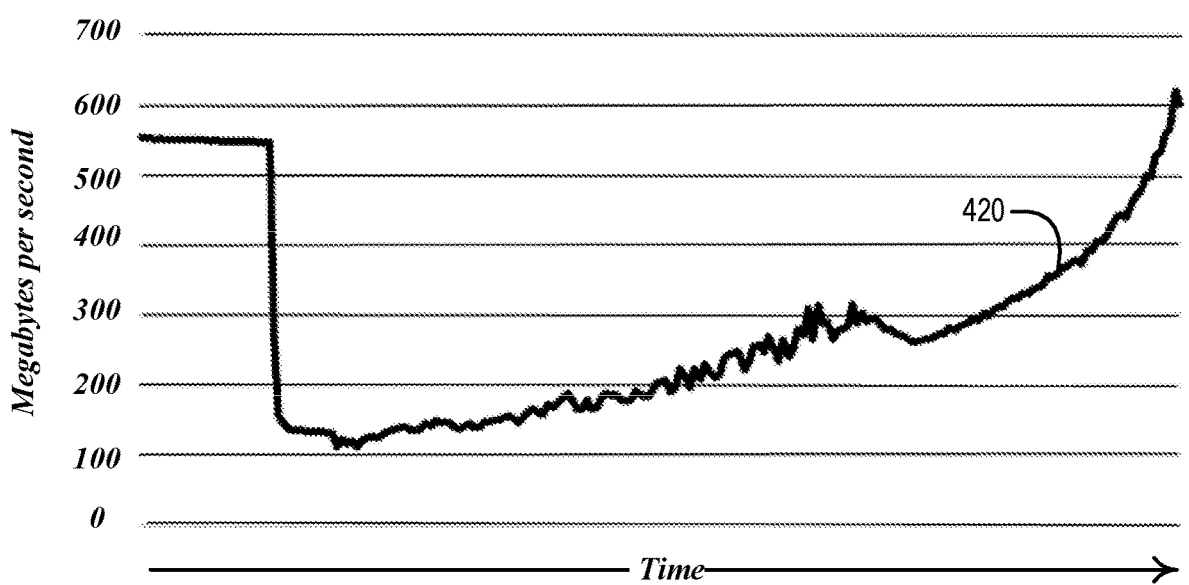
FIG. 4B illustrates an example of a plot of write speeds of a non-volatile memory over time, according to one or more embodiments.
Figure 4C:
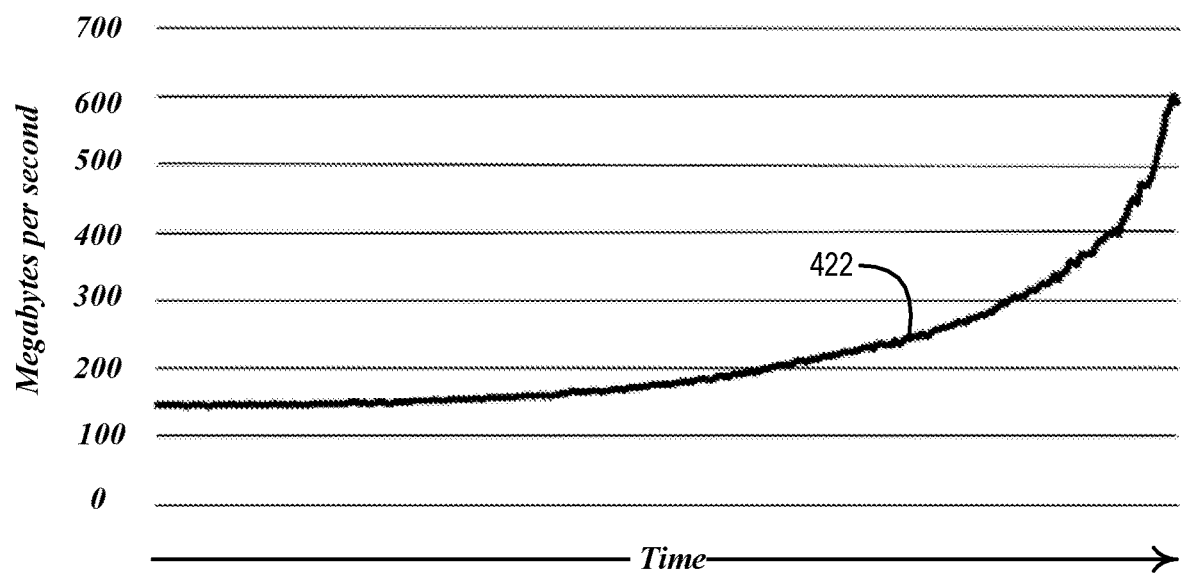
FIG. 4C illustrates another example of a plot of write speeds of a non-volatile memory over time, according to one or more embodiments.
Figure 4D:
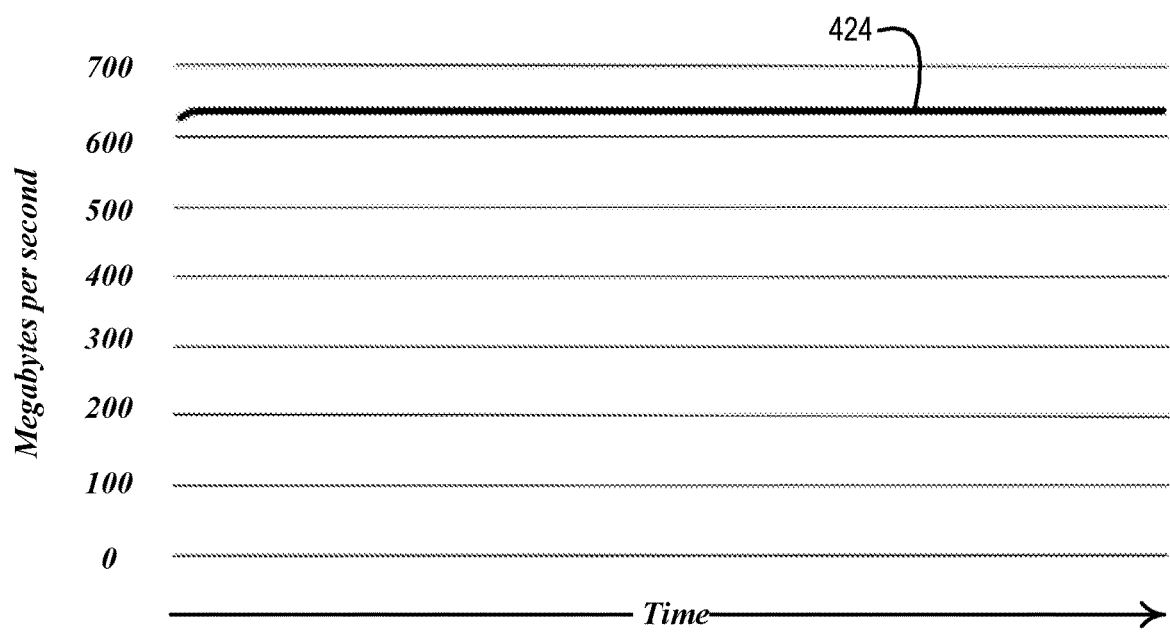
FIG. 4D illustrates an example plot of write speeds, over time, high enough to transfer data from a volatile memory medium to a non-volatile memory after a power loss, according to one or more embodiments.

In one or more embodiments, if NVM 210 is being utilized for other storage, NVM 210 may not be in a state that would provide peak sequential write performance. For example, utilizing a trim or a block discard may quickly clear data stored within a logical block address (LBA) range that will accept data 410. This may take an amount of time to complete, and if the one or more batteries do not store enough energy, a failure may occur during the trim operation. NVM 210 may not be conditioned for peak performance to finish transferring data 410 to NVM 210. Over time, for example, write speeds 420 of NVM 210 may vary, as shown in FIG. 4B. While write speeds 422 may improve over time, as illustrated in FIG. 4C, there may be no way to determine when the power loss to IHS 110 may occur. In one or more embodiments, NVM 210 may be pre-conditioned for peak sequential write performance. For example, write speeds 424, as shown in FIG. 4D, may be high enough such that data 410 may be transferred to NVM 210 while the one or more batteries can power IHS 110 after the power loss.

At 340, the information handling system may be powered down. In one example, OS 162 may power down IHS 110. For instance, the driver of OS 162 or the driver loaded into OS 162 may power down IHS 110. In another example, IHSFW 172 may power down IHS 110.

At 350, it may be determined that power is provided to the information handling system. In one example, OS 162 may determine that power is provided to IHS 110. For instance, the driver of OS 162 or the driver loaded into OS 162 may determine that power is provided to IHS 110. In another example, IHSFW 172 may determine that power is provided to IHS 110.

At 360, the data from the non-volatile memory medium may be transferred to the volatile memory medium. In one example, OS 162 may transfer data 410 from non-volatile memory medium 160 to volatile memory medium 150. For instance, the driver of OS 162 or the driver loaded into OS 162 may transfer data 410 from non-volatile memory medium 160 to volatile memory medium 150. In another example, IHSFW 172 may transfer data 410 from non-volatile memory medium 160 to volatile memory medium 150. In one or more embodiments, IHSFW 172 may provide, to OS 162, information that indicates that data 410 is to be transferred from non-volatile memory medium 160 to volatile memory medium 150. For example, IHSFW 172 providing, to OS 162, the information that indicates that data 410 is to be transferred from non-volatile memory medium 160 to volatile memory medium 150 may include IHSFW 172 utilizing a management information exchange to provide the information to OS 162. For instance, utilizing the management information exchange to provide the information to OS 162 may include utilizing one or more of CIM and WMI to provide the information to OS 162.

Figure 3B:
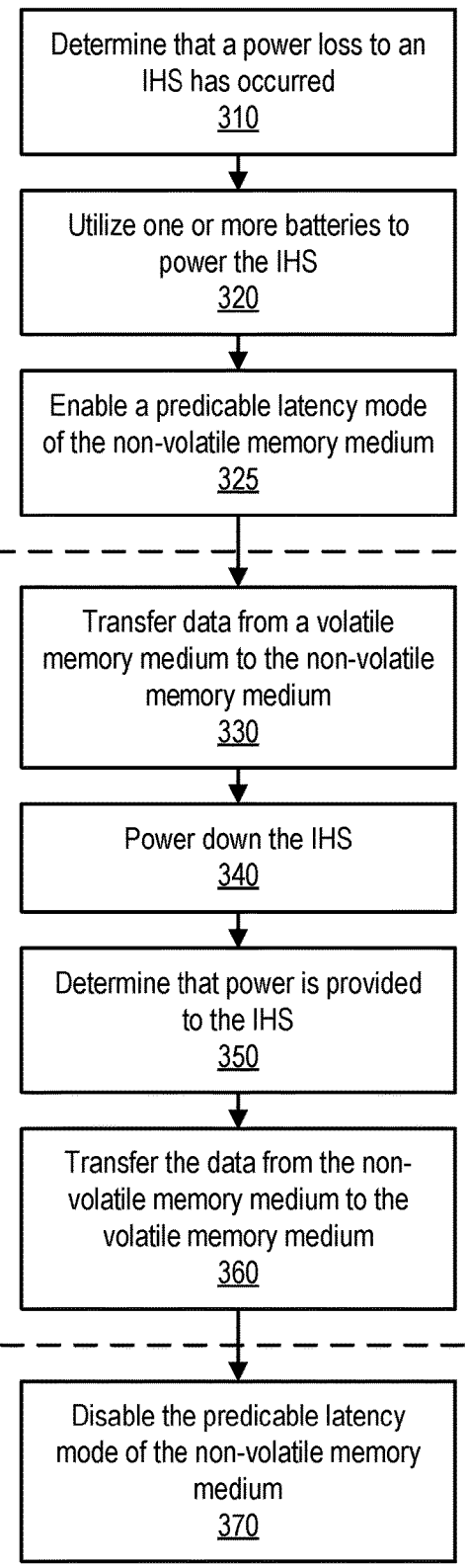
FIG. 3B illustrates a second example of a method of operating an information handling system, according to one or more embodiments.

Turning now to FIG. 3B, a second example of a method of operating an information handling system is illustrated, according to one or more embodiments. In one or more embodiments, method elements 310, 320, 340, and 350 of FIG. 3B may be performed in accordance with method elements 310, 320, 340, and 350 of FIG. 3A.

At 325, a predicable latency mode of a non-volatile memory medium may be enabled. In one example, OS 162 may enable a PLM of non-volatile memory medium 160. For instance, the driver of OS 162 or the driver loaded into OS 162 may enable a PLM of non-volatile memory medium 160. In another example, IHSFW 172 may enable a PLM of non-volatile memory medium 160. In one or more embodiments, enabling a PLM of non-volatile memory medium 160 may include enabling a PLM of NVM 210. For example, a deterministic window 380 may be entered. In one or more embodiments, deterministic window 380 may include one or more structures and/or functionalities as those described with reference to deterministic window 220.

At 330, data from a volatile memory medium may be transferred to a non-volatile memory medium. For example, data from volatile memory medium 150 may be transferred to non-volatile memory medium 160. In one instance, OS 162 may transfer data from volatile memory medium 150 to non-volatile memory medium 160. In another instance, the driver of OS 162 or the driver loaded into OS 162 may transfer data from volatile memory medium 150 to non-volatile memory medium 160. In one or more embodiments, IHSFW 172 may provide, to OS 162, information that indicates that data from volatile memory medium 150 is to be transferred to non-volatile memory medium 160. For example, IHSFW 172 providing, to OS 162, the information that indicates that data from volatile memory medium 150 is to be transferred to non-volatile memory medium 160 may include IHSFW 172 utilizing a management information exchange to provide the information to OS 162. For instance, utilizing the management information exchange to provide the information to OS 162 may include utilizing one or more of CIM and WMI to provide the information to OS 162.

Figure 4E:
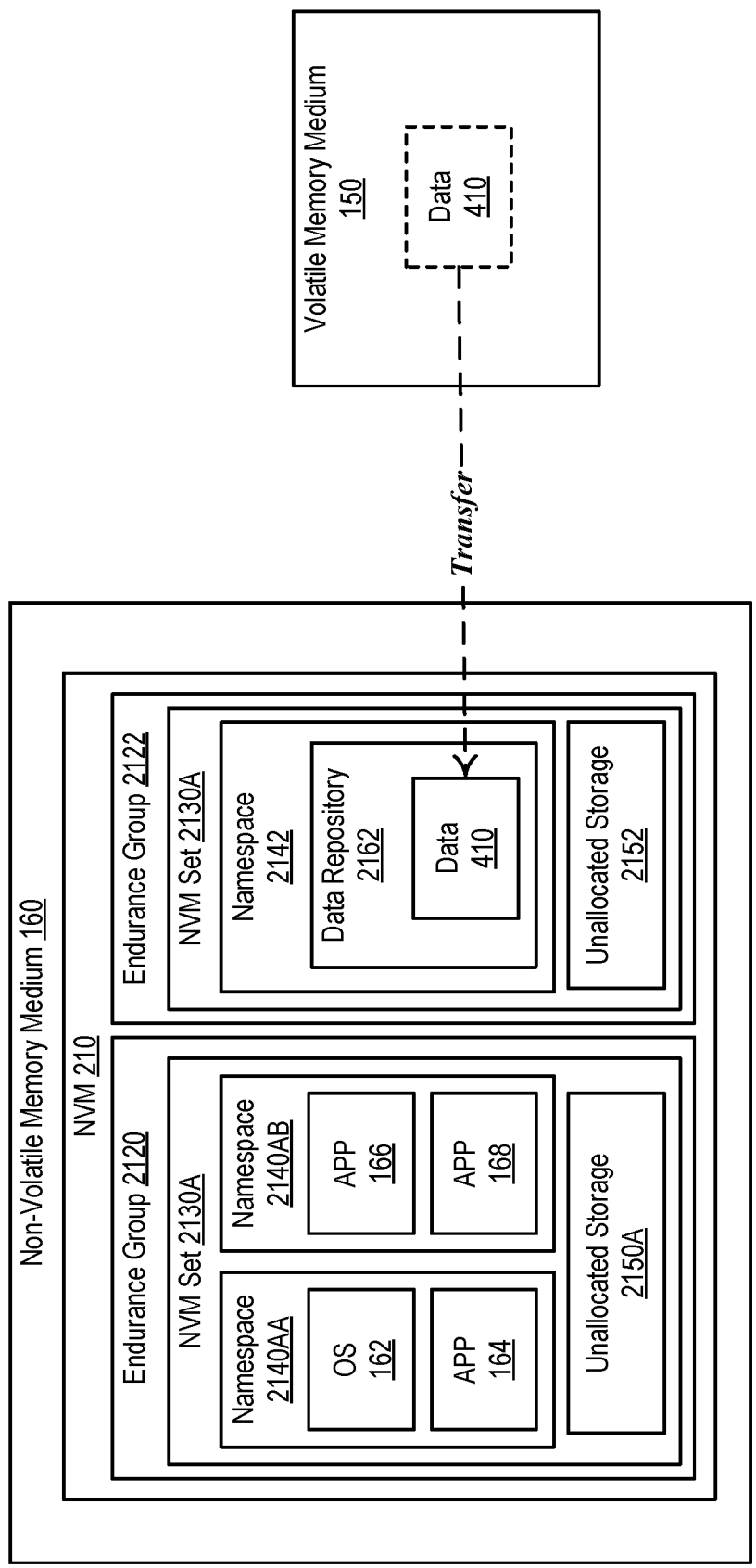
FIG. 4E illustrates an example of data transferred from a volatile memory medium to a data repository of a namespace of a non-volatile memory, according to one or more embodiments.

In one or more embodiments, non-volatile memory medium 160 may include NVM 210. For example, transferring data 410 from volatile memory medium 150 to non-volatile memory medium 160 may include transferring data 410 from volatile memory medium 150 to NVM 210. For instance, transferring data 410 from volatile memory medium 150 to NVM 210 may include transferring data 410 from volatile memory medium 150 to data repository 2162, as illustrated in FIG. 4E. In one or more embodiments, NVM 210 may be pre-conditioned for write performance. In one example, pre-conditioning NVM 210 may include writing conditioning data (e.g., zeros, an array of characters, etc.) to data repository 2162 before the power loss occurs. In a second example, pre-conditioning NVM 210 may include configuring data repository 2162 on a separate namespace (e.g., namespace 2142) than a namespace that stores OS 162 (e.g., namespace 2140AA). In a third example, pre-conditioning NVM 210 may include configuring data repository 2162 on a separate NVM set (e.g., NVM set 2130A) than a NVM set that stores OS 162 (e.g., NVM set 2130A). In a fourth example, pre-conditioning NVM 210 may include configuring data repository 2162 on a separate endurance group (e.g., endurance group 2122) than an endurance group that stores OS 162 (e.g., endurance group 2120). In another example, pre-conditioning NVM 210 may include configuring one or more data repositories 2162 on their own endurance group, NVM set, and/or namespace.

At 370, the predicable latency mode of the non-volatile memory medium may be disabled. In one example, OS 162 may disable the PLM of non-volatile memory medium 160. For instance, the driver of OS 162 or the driver loaded into OS 162 may disable the PLM of non-volatile memory medium 160. In another example, IHSFW 172 may disable the PLM of non-volatile memory medium 160.

In one or more embodiments, after the data is transferred from the non-volatile memory medium to the volatile memory medium, deterministic window 380 may be exited. For example, disabling the PLM of non-volatile memory medium 160 may exit deterministic window 380. For instance, disabling the PLM of NVM 210 may exit deterministic window 380. In one or more embodiments, OS 162 may resume normal I/O operations with non-volatile memory medium 160 after non-volatile memory medium 160 has exited deterministic window 380. In one or more embodiments, non-volatile memory medium 160 may provide, to OS 162, information that non-volatile memory medium 160 has exited deterministic window 380.

Figure 5:
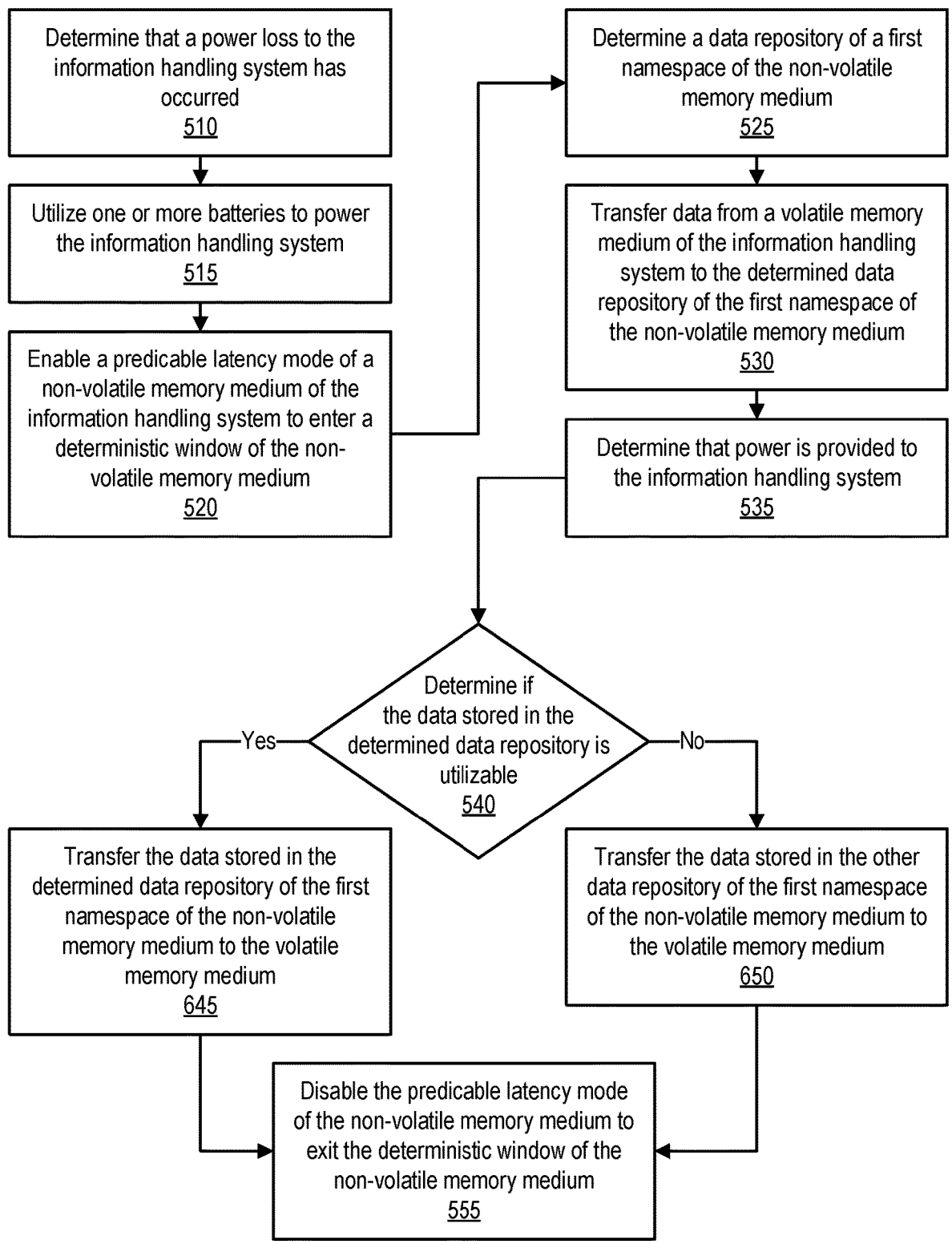
FIG. 5 illustrates a third example of a method of operating an information handling system, according to one or more embodiments.

Turning now to FIG. 5, a third example of a method of operating an information handling system is illustrated, according to one or more embodiments. At 510, it may be determined that a power loss to an information handling system has occurred. For example, it may be determined that a power loss to IHS 110 has occurred. At 515, one or more batteries may be utilized to power the information handling system. For example, one or more of batteries 130A-130C may be utilized to power IHS 110.

At 520, a predicable latency mode of the non-volatile memory medium may be enabled to enter a deterministic window of the non-volatile memory medium. For example, a predicable latency mode of non-volatile memory medium 160 may be enabled to enter a deterministic window 220 of non-volatile memory medium 160. For instance, a predicable latency mode of NVM 210 may be enabled to enter a deterministic window 220 of NVM 210. In one or more embodiments, the deterministic window may prevent at least one read operation from colliding with transferring the data from the volatile memory medium to the data repository of the first namespace. For example, the predicable latency mode may prevent at least one read operation from colliding with transferring the data from the volatile memory medium to the data repository of the first namespace.

At 525, a data repository of a first namespace of the non-volatile memory medium may be determined. For example, the first namespace of the non-volatile memory medium may include multiple data repositories. For instance, namespace 2142 may include data repositories 2162A and 2162B, as illustrated in FIG. 2D. In one or more embodiments, transferring data 415 from volatile memory medium 150 to namespace 2142 may include alternating between data repositories 2162A and 2162B.

At 530, data from a volatile memory medium of the information handling system may be transferred to the determined data repository of the first namespace of the non-volatile memory medium. In one example, if the determined data repository is data repository 2162A, data 410 may be transferred from volatile memory medium 150 to data repository 2162A of namespace 2142. In another example, if the determined data repository is data repository 2162B, data 410 may be transferred from volatile memory medium 150 to data repository 2162B of namespace 2142. At 535, it may be determined that power is provided to the information handling system.

At 540, it may be determined if the data stored in the determined data repository is utilizable. For example, determining if the data stored in the determined data repository is utilizable may include determining if the data stored in the determined data repository is complete. For instance, transferring the data from the volatile memory medium to the determined data repository of the first namespace may not have completed. As an example, the one or more batteries may not have provided the information handling system enough power to complete transferring the data from the volatile memory medium to the determined data repository of the first namespace.

If the data stored in the determined data repository is utilizable, the data stored in the determined data repository may be transferred to the volatile memory medium, at 545. In one example, if the determined data repository is data repository 2162A, data 410 may be transferred from data repository 2162A of namespace 2142 to volatile memory medium 150. In another example, if the determined data repository is data repository 2162B, data 410 may be transferred from data repository 2162B of namespace 2142 to volatile memory medium 150.

If the data stored in the determined data repository is not utilizable, the data stored in the other data repository may be transferred to the volatile memory medium, at 550. In one example, if the determined data repository is data repository 2162A, data 410 may be transferred from data repository 2162B of namespace 2142 to volatile memory medium 150. In another example, if the determined data repository is data repository 2162B, data 410 may be transferred from data repository 2162A of namespace 2142 to volatile memory medium 150. In this fashion, if the data stored in the determined data repository is not utilizable, data from a previous backup may be restored to the volatile memory medium, according to one or more embodiments.

At 555, the predicable latency mode of the non-volatile memory medium may be disabled to exit the deterministic window of the non-volatile memory medium. For example, the predicable latency mode of non-volatile memory medium 160 may be disabled to exit the deterministic window 220 of non-volatile memory medium 160. For instance, the predicable latency mode of NVM 210 may be disabled to exit the deterministic window 220 of NVM 210. In one or more embodiments, disabling the predicable latency mode of the non-volatile memory medium to exit the deterministic window of the non-volatile memory medium may be performed after transferring the data from the data repository of the first namespace of the non-volatile memory medium to the volatile memory medium.

Figure 6:
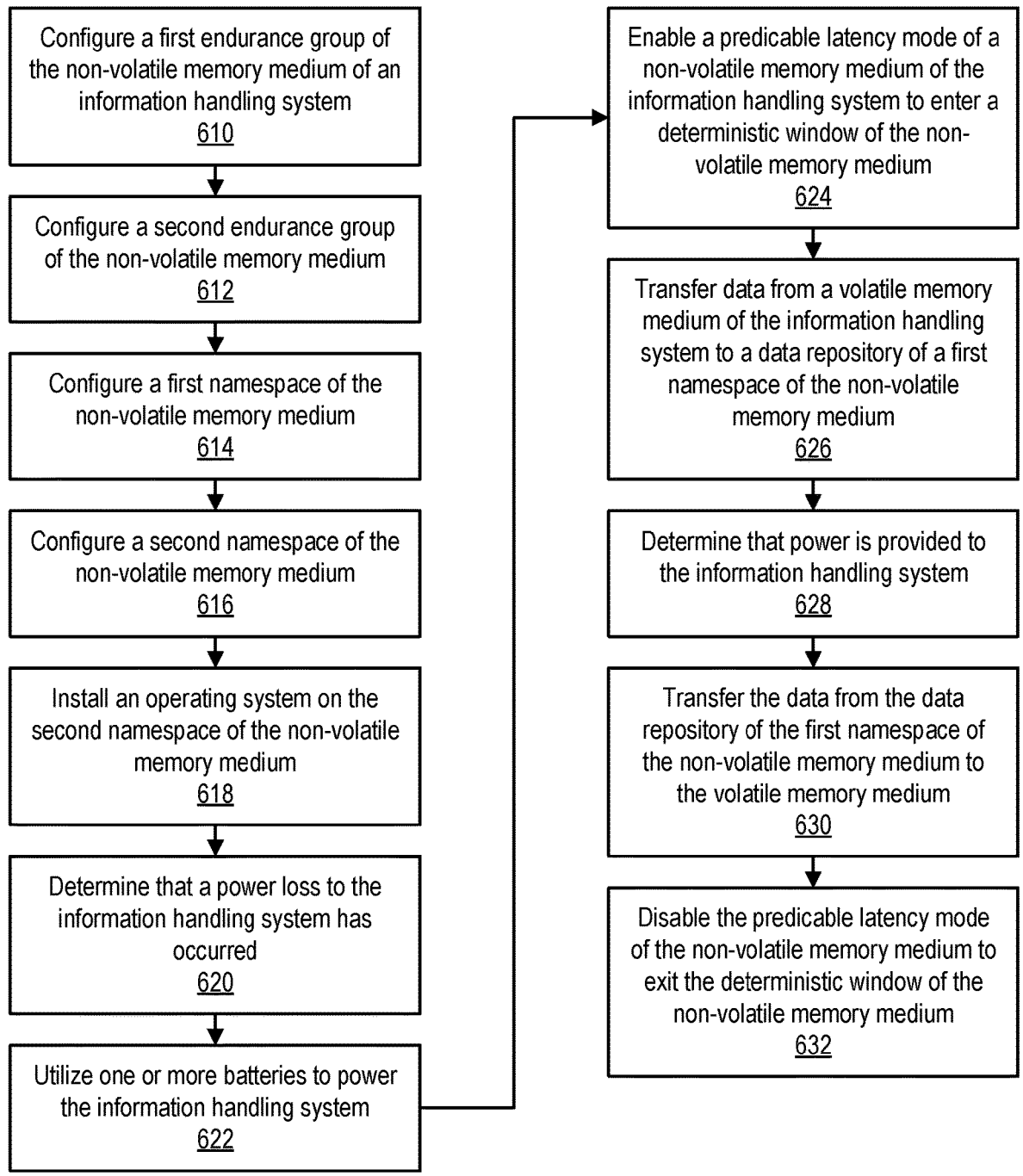
FIG. 6 illustrates another example of a method of operating an information handling system, according to one or more embodiments.

Turning now to FIG. 6, another example of a method of operating an information handling system is illustrated, according to one or more embodiments. At 610, a first endurance group of a non-volatile memory medium of an information handling system may be configured. For example, endurance group 2122 of non-volatile memory medium 160 may be configured. In one or more embodiments, non-volatile memory medium 160 may include NVM 210. For example, endurance group 2122 of NVM 210 may be configured. In one or more embodiments, NVM 210 may with at least a portion of a non-volatile memory express specification. For example, NVM 210 may with at least a portion of a non-volatile memory express specification version 1.4. In one or more embodiments, NVM 210 may be or may include a SDD. For example, the SDD may include flash memory. For instance, the flash memory may include NAND flash memory. In one or more embodiments, a first storage area of the non-volatile memory medium may include the first endurance group. For example, the first storage area may include a first pool of storage of the non-volatile memory medium.

At 612, a second endurance group of the non-volatile memory medium may be configured. For example, endurance group 2120 of non-volatile memory medium 160 may be configured. For instance, endurance group 2120 of NVM 210 may be configured. In one or more embodiments, a second storage area of the non-volatile memory medium may include the second endurance group. For example, the second storage area may include a second pool of storage of the non-volatile memory medium. For instance, the second storage area may be different from the first storage area. As an example, the second storage area may be independent from the first storage area.

At 614, a first namespace of the non-volatile memory medium may be configured. For example, namespace 2142 may be configured on non-volatile memory medium 160. In one or more embodiments, configuring the first namespace of the non-volatile memory medium may include configuring the first namespace on the first endurance group. For example, namespace 2142 may be configured on endurance group 2122. At 616, a second namespace of the non-volatile memory medium may be configured. For example, namespace 2140AA may be configured on non-volatile memory medium 160. In one or more embodiments, configuring the second namespace of the non-volatile memory medium may include configuring the second namespace on the second endurance group. For example, namespace 2140AA may be configured on endurance group 2120.

At 618, an operating system may be installed on the second namespace of the non-volatile memory medium. For example, OS 162 may be installed on namespace 2140AA. At 620, it may be determined that a power loss to an information handling system has occurred. For example, it may be determined that a power loss to IHS 110 has occurred. In one or more embodiments, determining that a power loss to an information handling system has occurred may include determining that A/C power is no longer available to the information handling system. In one example, a power outage may have occurred causing the A/C power to no longer be available to the information handling system. In another example, a power cord may have been unplugged. For instance, the power cord may have been accidentally unplugged. In one or more embodiments, a power supply of the information handling system may have developed an issue. For example, the power supply may no longer be able to properly power the information handling system. For instance, no longer being able to properly power the information handling system may include a power loss to an information handling system.

At 622, one or more batteries may be utilized to power the information handling system. For example, one or more of batteries 130A-130C may be utilized to power IHS 110. At 624, a predicable latency mode of the non-volatile memory medium may be enabled to enter a deterministic window of the non-volatile memory medium. For example, a predicable latency mode of non-volatile memory medium 160 may be enabled to enter a deterministic window 220 of non-volatile memory medium 160. For instance, a predicable latency mode of NVM 210 may be enabled to enter a deterministic window 220 of NVM 210. In one or more embodiments, the deterministic window may prevent at least one read operation from colliding with transferring the data from the volatile memory medium to the data repository of the first namespace. For example, the predicable latency mode may prevent at least one read operation from colliding with transferring the data from the volatile memory medium to the data repository of the first namespace.

At 626, data from a volatile memory medium of the information handling system may be transferred to a data repository of the first namespace of the non-volatile memory medium. For example, data 410 from volatile memory medium 150 may be transferred to data repository 2162 of namespace 2142. At 628, it may be determined that power is provided to the information handling system. For example, it may be determined that power is provided to IHS 110. In one instance, A/C power may be restored to IHS 110. In another instance, the power supply may be repaired or replaced with a functioning power supply.

At 630, the data from the data repository of the first namespace of the non-volatile memory medium may be transferred to the volatile memory medium. For example, data 410 of data repository 2162 of namespace 2142 may be transferred to volatile memory medium 150. In one or more embodiments, transferring the data from the data repository of the first namespace of the non-volatile memory medium to the volatile memory medium may be performed in response to determining that power is provided to the information handling system.

At 632, the predicable latency mode of the non-volatile memory medium may be disabled to exit the deterministic window of the non-volatile memory medium. For example, the predicable latency mode of non-volatile memory medium 160 may be disabled to exit the deterministic window 220 of non-volatile memory medium 160. For instance, the predicable latency mode of NVM 210 may be disabled to exit the deterministic window 220 of NVM 210. In one or more embodiments, disabling the predicable latency mode of the non-volatile memory medium to exit the deterministic window of the non-volatile memory medium may be performed after transferring the data from the data repository of the first namespace of the non-volatile memory medium to the volatile memory medium.

In one or more embodiments, one or more of the method and/or process elements and/or one or more portions of a method and/or a process element may be performed in varying orders, may be repeated, or may be omitted. Furthermore, additional, supplementary, and/or duplicated method and/or process elements may be implemented, instantiated, and/or performed as desired, according to one or more embodiments. Moreover, one or more of system elements may be omitted and/or additional system elements may be added as desired, according to one or more embodiments.

In one or more embodiments, a memory medium may be and/or may include an article of manufacture. For example, the article of manufacture may include and/or may be a software product and/or a program product. For instance, the memory medium may be coded and/or encoded with processor-executable instructions in accordance with at least a portion of one or more flowcharts, at least a portion of one or more systems, at least a portion of one or more methods, and/or at least a portion of one or more processes described herein to produce the article of manufacture.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. An information handling system, comprising:
   at least one processor;
   a volatile memory medium coupled to the at least one processor;
   a non-volatile memory medium coupled to the at least one processor, the non-volatile memory medium comprising:
      a non-volatile memory set with at least one namespace; and
   a memory medium, coupled to the at least one processor, that stores instructions executable by the at least one processor, which when executed by the at least one processor, cause the information handling system to:
      select a namespace of the at least one namespace for data backup;
      configure the selected namespace for peak sequential write performance
      determine that a power loss to the information handling system has occurred;
      utilize one or more batteries to power the information handling system;
      enable a predicable latency mode of the non-volatile memory medium to enter a deterministic window of the non-volatile memory medium;
      transfer data from the volatile memory medium to a first data repository and a second data repository of the selected namespace, including alternating the transfer of data between the first data repository and the second data repository;
      determine that the data stored at the first data repository is not utilizable;
      determine that power is provided to the information handling system;

in response to determining that power is provided to the information handling system, transfer the data from the second data repository of the selected namespace to the volatile memory medium based on determining that the data stored at the first data repository is not utilizable; and after transferring the data from the second data repository of the selected namespace to the volatile memory medium, disable the predicable latency mode of the non-volatile memory medium to exit the deterministic window of the non-volatile memory medium.

2. The information handling system of claim 1, wherein the deterministic window prevents at least one read operation from colliding with transferring the data from the volatile memory medium to the first and the second data repository of the selected namespace.

3. The information handling system of claim 1, wherein the non-volatile memory medium includes a non-volatile memory that includes a solid state drive.

4. The information handling system of claim 1, wherein the non-volatile memory medium includes a non-volatile memory that complies with at least a portion of a non-volatile memory express specification.

5. The information handling system of claim 1, wherein the instructions further cause the information handling system to:
configure the selected namespace of the non-volatile memory medium to only be utilized for data backup.

6. The information handling system of claim 5, wherein:
the selected namespace comprises a first namespace of the non-volatile memory medium; and
the instructions further cause the information handling system to:
configure a second namespace of the non-volatile memory medium, different from the first namespace of the non-volatile memory medium; and
install an operating system on the second namespace of the non-volatile memory medium.

7. The information handling system of claim 6,
wherein the instructions further cause the information handling system to:
configure a first endurance group of the non-volatile memory medium; and
configure a second endurance group of the non-volatile memory medium;
wherein, to configure the first namespace of the non-volatile memory medium, the instructions further cause the information handling system to configure the first namespace on the first endurance group; and
wherein, to configure the second namespace of the non-volatile memory medium, the instructions further cause the information handling system to configure the second namespace on the second endurance group.

8. The information handling system of claim 7,
wherein a first storage area of the non-volatile memory medium includes the first endurance group; and
wherein a second storage area of the non-volatile memory medium, different from the first storage area, includes the second endurance group.

9. A method, comprising:
selecting a namespace for data backup from a set of namespaces in a non-volatile memory set of a non-volatile memory medium;
configuring the selected namespace for peak sequential write performance;

determining that a power loss to an information handling system has occurred;
utilizing one or more batteries to power the information handling system;
enabling a predicable latency mode of the non-volatile memory medium of the information handling system to enter a deterministic window of the non-volatile memory medium;
transferring data from a volatile memory medium of the information handling system to a data repository of the selected namespace of the non-volatile memory medium, including alternating the transfer of data between the first data repository and the second data repository;
determining that power is provided to the information handling system;
in response to the determining that power is provided to the information handling system, transferring the data from the second data repository of the selected namespace of the non-volatile memory medium to the volatile memory medium based on determining that the data stored at the first data repository is not utilizable; and
after the transferring the data from the second data repository of the selected namespace of the non-volatile memory medium to the volatile memory medium, disabling the predicable latency mode of the non-volatile memory medium to exit the deterministic window of the non-volatile memory medium.

10. The method of claim 9, wherein the deterministic window prevents at least one read operation from colliding with the transferring the data from the volatile memory medium to the first and the second data repository of the selected namespace.

11. The method of claim 9, wherein the non-volatile memory medium includes a non-volatile memory that includes a solid state drive.

12. The method of claim 9, wherein the non-volatile memory medium includes a non-volatile memory that complies with at least a portion of a non-volatile memory express specification.

13. The method of claim 9, further comprising:
configuring a second namespace of the non-volatile memory medium, different from the first namespace of the non-volatile memory medium; and
installing an operating system on the second namespace of the non-volatile memory medium.

14. The method of claim 13, further comprising:
configuring a first endurance group of the non-volatile memory medium; and
configuring a second endurance group of the non-volatile memory medium;
wherein the configuring the first namespace of the non-volatile memory medium includes configuring the first namespace on the first endurance group; and
wherein the configuring the second namespace of the non-volatile memory medium includes configuring the second namespace on the second endurance group.

15. The method of claim 14,
wherein a first storage area of the non-volatile memory medium includes the first endurance group; and
wherein a second storage area of the non-volatile memory medium, different from the first storage area, includes the second endurance group.

16. A computer-readable non-transitory memory medium that includes instructions that, when executed by at least one processor of an information handling system, cause the information handling system to:

select a namespace for data backup from a set of namespaces in a non-volatile memory set of a non-volatile memory medium;

configure the selected namespace for peak sequential write performance;

determine that a power loss to the information handling system has occurred;

utilize one or more batteries to power the information handling system;

enable a predicable latency mode of a non-volatile memory medium of the information handling system to enter a deterministic window of the non-volatile memory medium;

transfer data from a volatile memory medium of the information handling system to a data repository of the selected namespace of the non-volatile memory medium, including alternating the transfer of data between the first data repository and the second data repository;

determine that power is provided to the information handling system;

in response to determining that power is provided to the information handling system, transfer the data from the second data repository of the selected namespace of the non-volatile memory medium to the volatile memory medium based on determining that the data stored at the first data repository is not utilizable; and after transferring the data from the second data repository of the selected namespace of the non-volatile memory medium to the volatile memory medium, disable the predicable latency mode of the non-volatile memory medium to exit the deterministic window of the non-volatile memory medium.

17. The computer-readable non-transitory memory medium of claim 16, wherein the deterministic window prevents at least one read operation from colliding with transferring the data from the volatile memory medium to the first and the second data repository of the selected namespace.

18. The computer-readable non-transitory memory medium of claim 16, wherein the non-volatile memory medium includes a non-volatile memory that includes a solid state drive.

19. The computer-readable non-transitory memory medium of claim 16, wherein the instructions further cause the information handling system to:

configure a first namespace comprising the selected namespace of the non-volatile memory medium;

configure a second namespace of the non-volatile memory medium, different from the first namespace of the non-volatile memory medium, for an operating system;

configure a first endurance group of the non-volatile memory medium; and configure a second endurance group of the non-volatile memory medium;

wherein, to configure the first namespace of the non-volatile memory medium, the instructions further cause the information handling system to configure the first namespace on the first endurance group;

wherein, to configure the second namespace of the non-volatile memory medium, the instructions further cause the information handling system to configure the second namespace on the second endurance group;

wherein a first storage area of the non-volatile memory medium includes the first endurance group; and wherein a second storage area of the non-volatile memory medium, different from the first storage area, includes the second endurance group.

\* \* \* \* \*